US011261846B2

(12) United States Patent
Wagoner et al.

(10) Patent No.: US 11,261,846 B2
(45) Date of Patent: Mar. 1, 2022

(54) SYSTEM AND METHOD FOR DESIGNING AND OPERATING A WIND TURBINE POWER SYSTEM BASED ON STATISTICAL ANALYSIS OF OPERATIONAL AND/OR GRID DATA THEREOF

(71) Applicant: General Electric Company, Schenectady, NY (US)

(72) Inventors: Robert Gregory Wagoner, Roanoke, VA (US); Dale Robert Mashtare, Greenville, SC (US); Pedro Arsuaga Santos, Niskayuna, NY (US); James Gregory Rotbert, North Potomac, MA (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 16/671,682

(22) Filed: Nov. 1, 2019

(65) Prior Publication Data
US 2021/0135611 A1    May 6, 2021

(51) Int. Cl.
*F03D 7/04* (2006.01)
*F03D 9/25* (2016.01)
(Continued)

(52) U.S. Cl.
CPC .............. *F03D 7/048* (2013.01); *F03D 7/045* (2013.01); *F03D 7/046* (2013.01); *F03D 9/255* (2017.02);
(Continued)

(58) Field of Classification Search
CPC . F03D 7/04; F03D 7/045; F03D 7/046; F03D 7/048; F03D 9/255; F03D 17/00;
(Continued)

(56) References Cited

U.S. PATENT DOCUMENTS 6,705,838 B1 * 3/2004 Bak .................. F03D 1/0641
416/243
8,178,986 B2 * 5/2012 Vyas .................... G06Q 10/04
290/44
(Continued)

FOREIGN PATENT DOCUMENTS

CN    102708266 A    10/2012
CN    102684201 B    7/2014
(Continued)

OTHER PUBLICATIONS

European Search Report for EP Application No. 20204696.7, dated Mar. 19, 2021.

*Primary Examiner* — Crystal J Barnes-Bullock
(74) *Attorney, Agent, or Firm* — Dority & Manning, P.A.

(57) ABSTRACT

A method for operating a wind turbine power system connected to an electrical grid includes collecting data relating to one or more parameters of one or more electrical components of the wind turbine power system. The method may also include performing a statistical analysis of the data relating to one or more parameters of the one or more electrical components. Further, the method includes predicting future behavior of the electrical component(s) based on the statistical analysis. Moreover, the method includes determining set points for the electrical component(s) using the predicted future behavior. In addition, the method includes operating the wind turbine power system at the determined set points for the electrical component(s) so as to optimize at least one characteristic of the electrical component(s).

13 Claims, 6 Drawing Sheets

(51) Int. Cl.
*H02P 9/00* (2006.01)
*H02P 9/04* (2006.01)
*H02P 101/15* (2016.01)

(52) U.S. Cl.
CPC ............. *H02P 9/007* (2013.01); *H02P 9/04* (2013.01); *H02P 2101/15* (2015.01)

(58) Field of Classification Search
CPC .. H02P 9/007; H02P 9/04; H02P 9/046; H02P 2101/15
See application file for complete search history.

(56) References Cited

U.S. PATENT DOCUMENTS

| | | | | |
|---|---|---|---|---|
| 8,489,247 | B1* | 7/2013 | Engler | F01D 17/24 |
| | | | | 700/291 |
| 8,606,418 | B1* | 12/2013 | Myers | F03D 7/048 |
| | | | | 700/287 |
| 8,649,911 | B2* | 2/2014 | Avagliano | H02J 3/381 |
| | | | | 700/291 |
| 8,694,171 | B2* | 4/2014 | Ichinose | F03D 7/047 |
| | | | | 700/287 |
| 8,874,276 | B2* | 10/2014 | Garcia | F03D 7/0284 |
| | | | | 700/287 |
| 9,103,438 | B2* | 8/2015 | Caldwell | F16H 61/4035 |
| 9,217,416 | B2* | 12/2015 | Spruce | F03D 7/0272 |
| 9,397,599 | B2* | 7/2016 | Letas | H02J 3/386 |
| 9,551,322 | B2* | 1/2017 | Ambekar | F03D 7/045 |
| 9,683,552 | B2* | 6/2017 | Tiwari | F03D 7/04 |
| 10,079,317 | B2 | 9/2018 | Gonatas | |
| 10,234,853 | B2* | 3/2019 | Mukkamala | G06F 3/04845 |
| 10,371,124 | B2* | 8/2019 | Wilson | F03D 7/048 |
| 10,605,228 | B2* | 3/2020 | Evans | F03D 7/048 |
| 10,671,039 | B2* | 6/2020 | Herzog | G05B 19/0426 |
| 10,815,972 | B2* | 10/2020 | Evans | F03D 7/048 |
| 10,956,632 | B2* | 3/2021 | Wang | G06F 30/20 |
| 11,053,915 | B2* | 7/2021 | Gregersen | F03D 7/00 |
| 2011/0004356 | A1* | 1/2011 | Garcia | F03D 7/046 |
| | | | | 700/287 |
| 2012/0101644 | A1 | 4/2012 | Evans et al. | |
| 2012/0143565 | A1 | 6/2012 | Graham et al. | |
| 2015/0152847 | A1* | 6/2015 | Guadayol Roig | F03D 7/028 |
| | | | | 290/44 |
| 2016/0215759 | A1* | 7/2016 | Fleming | F03D 7/046 |
| 2017/0241405 | A1* | 8/2017 | Kruger | F03D 7/048 |
| 2019/0236456 | A1* | 8/2019 | Kim | F03D 17/00 |
| 2020/0056589 | A1* | 2/2020 | Evans | F03D 7/045 |
| 2020/0166016 | A1* | 5/2020 | Cortiana | F03D 7/048 |
| 2020/0201950 | A1* | 6/2020 | Wang | G06F 30/20 |
| 2020/0300227 | A1* | 9/2020 | Evans | F03D 7/048 |

FOREIGN PATENT DOCUMENTS

| | | |
|---|---|---|
| CN | 104915737 A | 9/2015 |
| EP | 2 549 641 A1 | 1/2013 |
| EP | 3 118 783 A1 | 1/2017 |
| WO | WO 2017/205221 A1 | 11/2017 |

* cited by examiner

SYSTEM AND METHOD FOR DESIGNING AND OPERATING A WIND TURBINE POWER SYSTEM BASED ON STATISTICAL ANALYSIS OF OPERATIONAL AND/OR GRID DATA THEREOF

FIELD

The present disclosure relates generally to wind turbines, and more particular to systems and methods for designing and/or operating wind turbine components based on statistical analysis of operational and/or grid data so as to decrease unnecessary design margins.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity. In addition, a plurality of the wind turbines may be arranged in a predetermined geological location and electrically connected together to form a wind farm.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. As such, typical wind turbines also include various electrical components for converting the mechanical energy to electrical power. For example, the high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to an electrical grid via a grid breaker. Thus, the turbine transformer steps up the voltage amplitude of the electrical power such that the transformed electrical power may be further transmitted to the electrical grid.

In many wind turbines, the generator rotor may also be electrically coupled to a bi-directional power converter that includes a rotor side converter joined to a line side converter via a regulated DC link. More specifically, some wind turbines, such as wind-driven doubly-fed induction generator (DFIG) systems or full power conversion systems, may include a power converter with an AC-DC-AC topology.

Typical wind turbine components, particularly the electrical components, are designed for worse-case scenario conditions (e.g. a combination of the hottest day of the year, the highest current, the highest voltage, etc.). During the lifecycle of a wind turbine, such a combination of operating conditions likely never occurs. Accordingly, conventional wind turbines are overdesigned and include large operating margins, which add substantial cost to the system.

Therefore, a system and method for designing and/or operating electrical components of the wind turbine to more accurately reflect actual operating conditions would be welcomed in the art. As such, the present disclosure is directed to a system and method for designing and/or operating electrical components of the wind turbine based on probability of certain conditions being met so as to decrease unnecessary design margins.

BRIEF DESCRIPTION

Aspects and advantages of the invention will be set forth in part in the following description, or may be obvious from the description, or may be learned through practice of the invention In one aspect, the present disclosure is directed to a method for operating a wind turbine power system connected to an electrical grid. The wind turbine power system has one or more electrical components. The method includes collecting data relating to one or more parameters of the one or more electrical components. The method may also include performing a statistical analysis of the data relating to one or more parameters of the one or more electrical components. Further, the method includes predicting future behavior of the electrical component(s) based on the statistical analysis. Moreover, the method includes determining set points for the electrical component(s) using the predicted future behavior. In addition, the method includes operating the wind turbine power system at the determined set points for the electrical component(s) so as to optimize at least one characteristic of the electrical component(s).

In an embodiment, for example, the electrical component(s) may include at least one of a generator, a power converter, a transformer, a switchgear, cables or cabling, a pitch system, or a yaw system.

In another embodiment, the data may include, for example, predicted or forecasted data, simulated data, measured operational data, calculated data, turbine fleet data, and/or historical data. Moreover, the data may be stored in at least one database. In addition, the parameter(s) may include, for example, voltage, current, temperature, time, and/or combinations or functions thereof.

In further embodiments, the data may be stored in a plurality of databases. Thus, in such embodiments, collecting the data relating to the parameter(s) of the electrical component(s) may include collecting the data relating to the parameter(s) of the electrical component(s) from the plurality of databases.

In several embodiments, the statistical analysis may include an individual probability, a combined probability, a mean, an outlier, a standard deviation, and/or combinations thereof, as well as any other suitable statistical analysis. For example, in an embodiment, the individual probability or the combined probability may include, for example, a probability of the electrical component(s) operating in a certain range, a probability of one or more certain events occurring in the electrical component(s), or a probability of one or more certain conditions occurring in the electrical component(s).

In particular embodiments, the wind turbine power system may be part of a wind farm comprising a plurality of wind turbine power systems. In such embodiments, the method may further include maximizing, via a farm-level controller that distributes real power and/or reactive power demands differently across the plurality of wind turbine power systems, a capability of each of the plurality of wind turbine power systems in the wind farm depending on the individual probability or the combined probability for specific wind turbine power systems of the plurality of wind turbine power systems so as to optimize power output of the wind farm.

In another embodiment, applying the statistical analysis to the data relating to the parameter(s) of the electrical component(s) may include determining a first probability of the electrical component(s) operating in a first range or a first event occurring in the electrical component(s), determining a second probability of the electrical component(s) operating in a second range or a second event occurring in the electrical component(s), and multiplying the first and second probabilities of the first and second events together to obtain the combined probability.

In still further embodiments, the characteristic(s) of the electrical component(s) may include at least one of power output, reliability, maintenance, capability, or failure rate. In additional embodiments, the method may also include optimizing the characteristic(s) of the electrical component(s) by allowing for increases or decreases in the characteristic(s) of the electrical component(s) based on the statistical analysis.

In an embodiment, the method may include estimating the probability of operation of the electrical component(s) throughout a P-Q capability curve using the data and determining the set points for the electrical component(s) using the probability of operation of the electrical component(s) throughout the P-Q capability curve.

In such embodiments, the method may further include optimizing power output of the wind turbine power system using the probability of operation of the electrical component(s) throughout the P-Q capability curve.

In yet another embodiment, the method may include deriving region data from the collected data relating to the parameter(s) of the electrical component(s) and generating one or more region-specific P-Q capability curves based on the region data.

In still further embodiments, the method may include customizing expansion of the P-Q capability curve by coupling an additional power generation unit with the wind turbine power system or a hybrid power generation system containing the wind turbine power system.

In particular embodiments, the method may include acquiring data relating to derating of the wind turbine power system due solely to increasing VAR demand from the electrical grid and converting the data to a revenue decrease for the wind turbine power system due to VAR-related derates.

In another aspect, the present disclosure is directed to a system for optimizing design of one or more electrical components of a wind turbine power system. The system includes a controller having at least one processor configured to perform a plurality of operations. For example, the plurality of operations may include collecting data relating to one or more parameters of the electrical component(s), performing a statistical analysis of the data relating to the parameter(s) of the electrical component(s), the statistical analysis comprising, at least, a combined probability, predicting future behavior of the electrical component(s) based on the statistical analysis, sizing the electrical component(s) using the predicted future behavior so as to minimize design margins of the electrical component(s), and installing the wind turbine power system according to the sizing so as to optimize at least one characteristic of the electrical component(s). It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
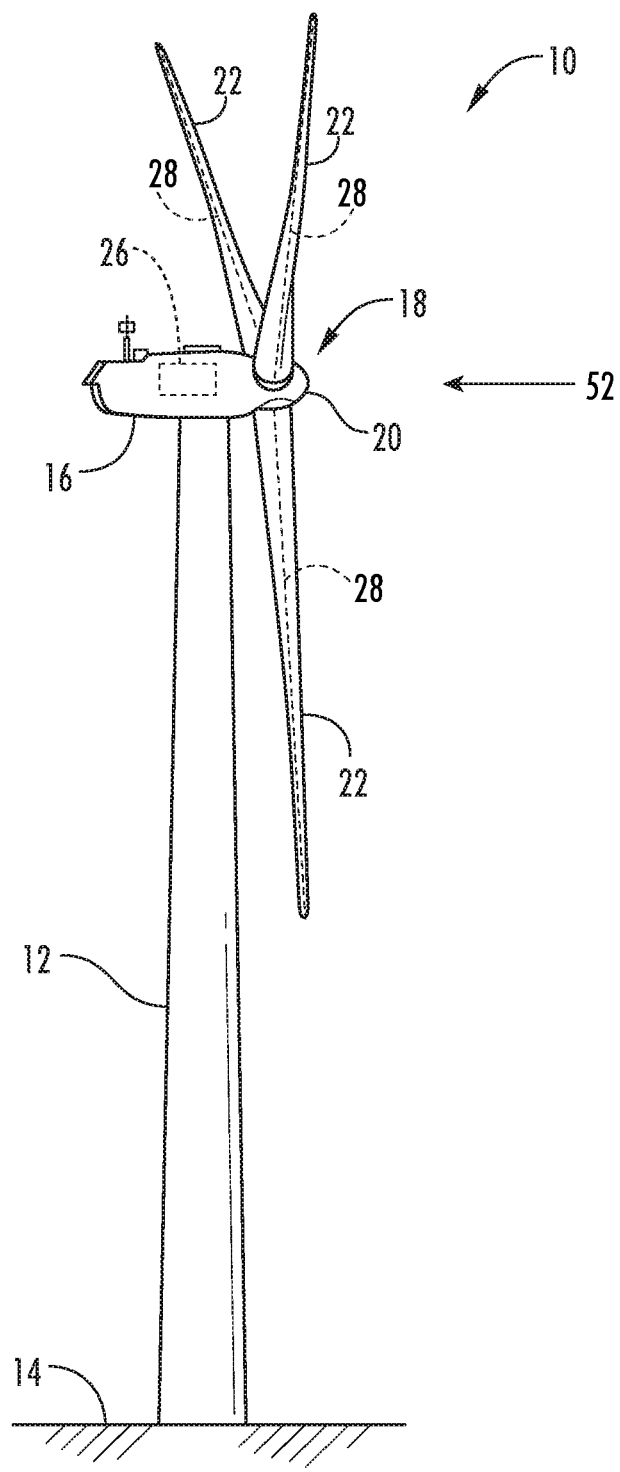
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
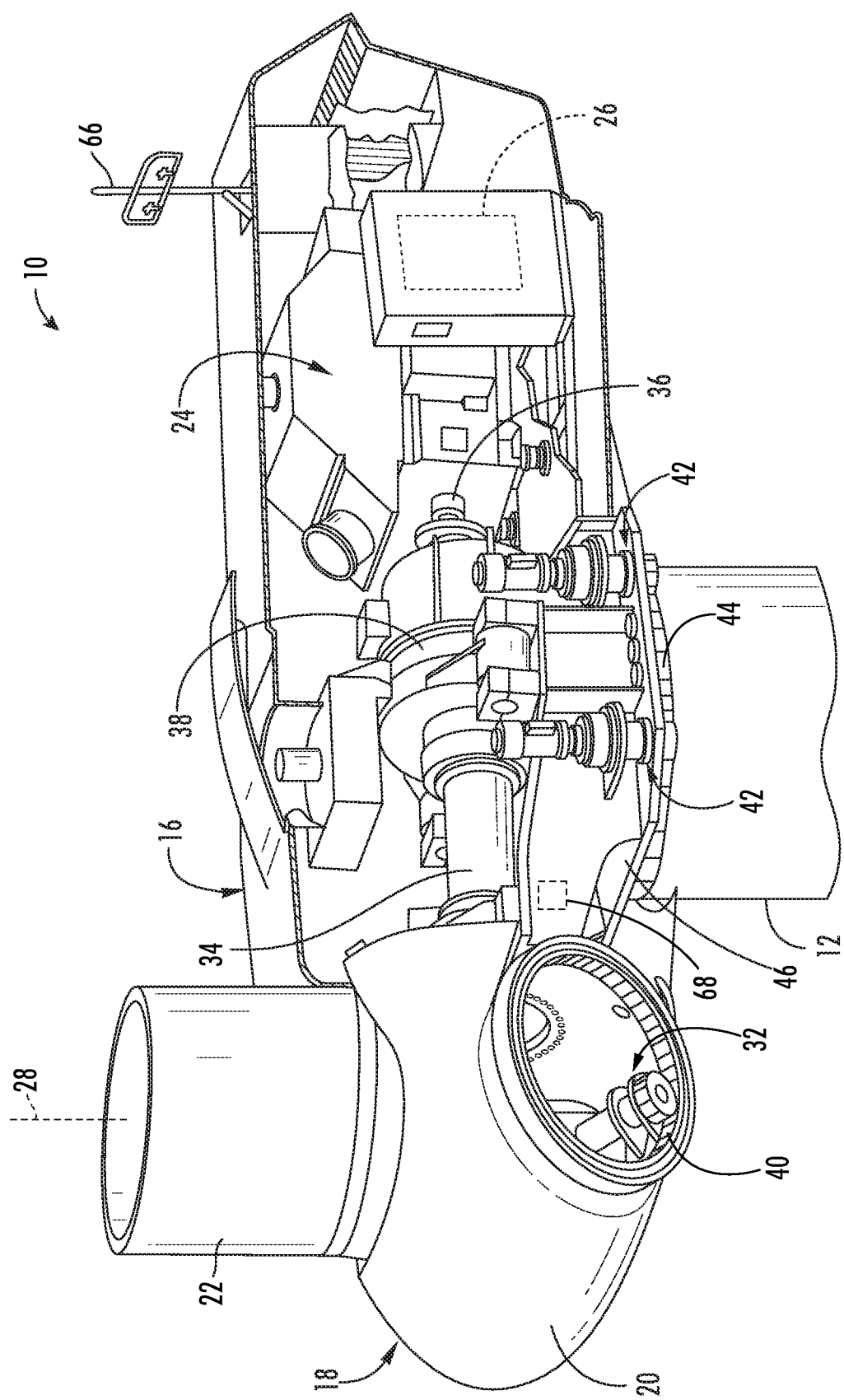
FIG. 2 illustrates a simplified, internal view of one embodiment of a nacelle according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example. Light Detection and Ranging ("LIDAR") devices. Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
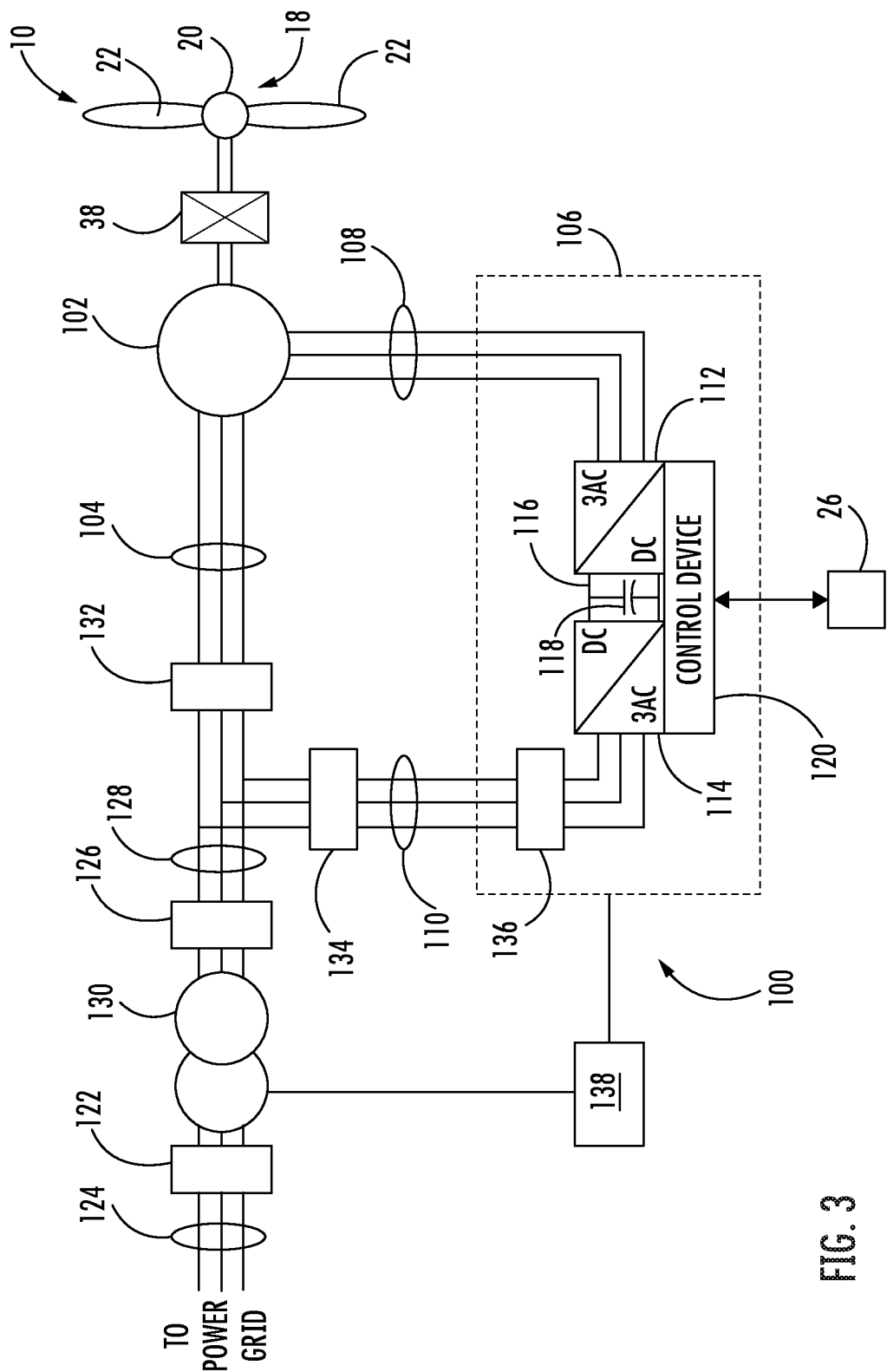
FIG. 3 illustrates a schematic view of one embodiment of a wind turbine electrical power system suitable for use with the wind turbine shown in FIG. 1.

Referring now to FIG. 3, a schematic diagram of one embodiment of a wind turbine power system 100 is illustrated in accordance with aspects of the present disclosure. Although the present disclosure will generally be described herein with reference to the system 100 shown in FIG. 3, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 3 and as mentioned, the rotor 18 of the wind turbine 10 (FIG. 1) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g. three-phase power) from a stator of the DFIG 102, and the rotor bus 108 may provide an output multiphase power (e.g. three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices, such as those described in FIG. 5.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g. three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g. IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g. IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g. three-phase power) having a frequency maintained substantially at the frequency of the electrical grid 124 (e.g. 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g. three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 4:
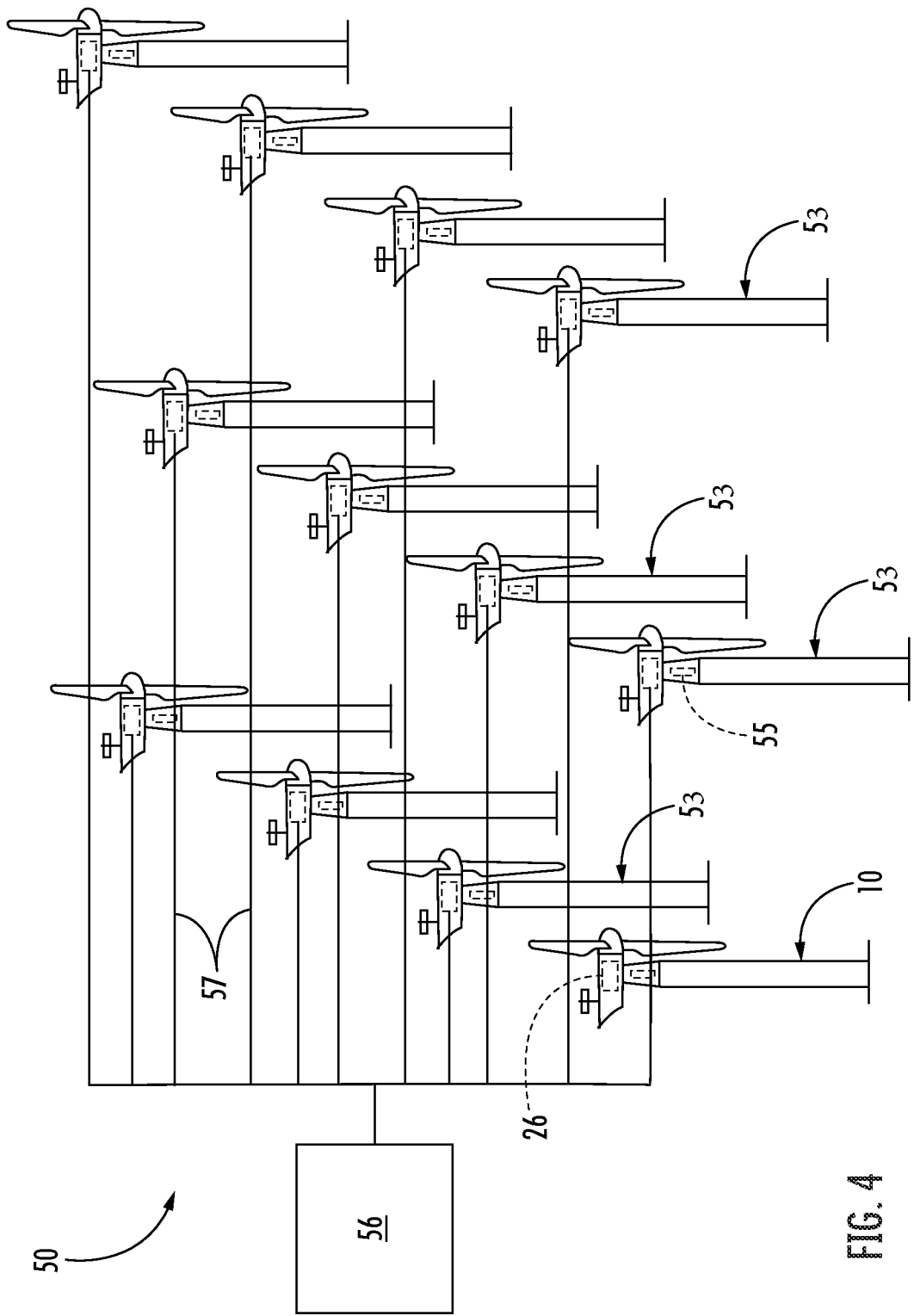
FIG. 4 illustrates a wind farm having a plurality of wind turbines according to the present disclosure.

Referring now to FIG. 4, the wind turbine power system 100 described herein may be part of a wind farm 50. As shown, the wind farm 50 may include a plurality of wind turbines 53, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 53 are communicatively coupled to the farm-level controller 56, e.g. through a wired connection, such as by connecting the turbine controller 26 through suitable communicative links 57 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 53, such as for example, distributing real and/or reactive power demands across the wind turbines 53 of the wind farm 50.

Still referring to FIG. 4, the wind farm 50 may be a hybrid system having one or more additional active or passive power generation units 55, such as for, example, a solar power generation device, an energy storage system (such as a battery bank), a reactive power (VAR) generation unit or bank (at either or both of the turbine-level or farm-level), or similar. For example, as shown in FIG. 3, the wind turbine power system 100 includes a reactive power generation unit 138. Therefore, it should be understood that such additional power generation devices may be utilized at either or both of the turbine-level or farm-level.

Figure 5:
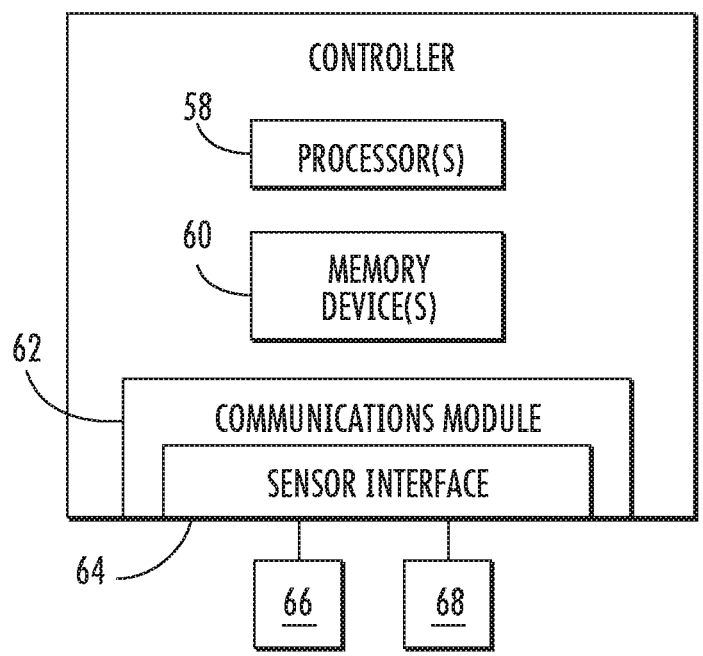
FIG. 5 illustrates a block diagram of one embodiment of a controller according to the present disclosure.

Referring now to FIG. 5, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Figure 6:
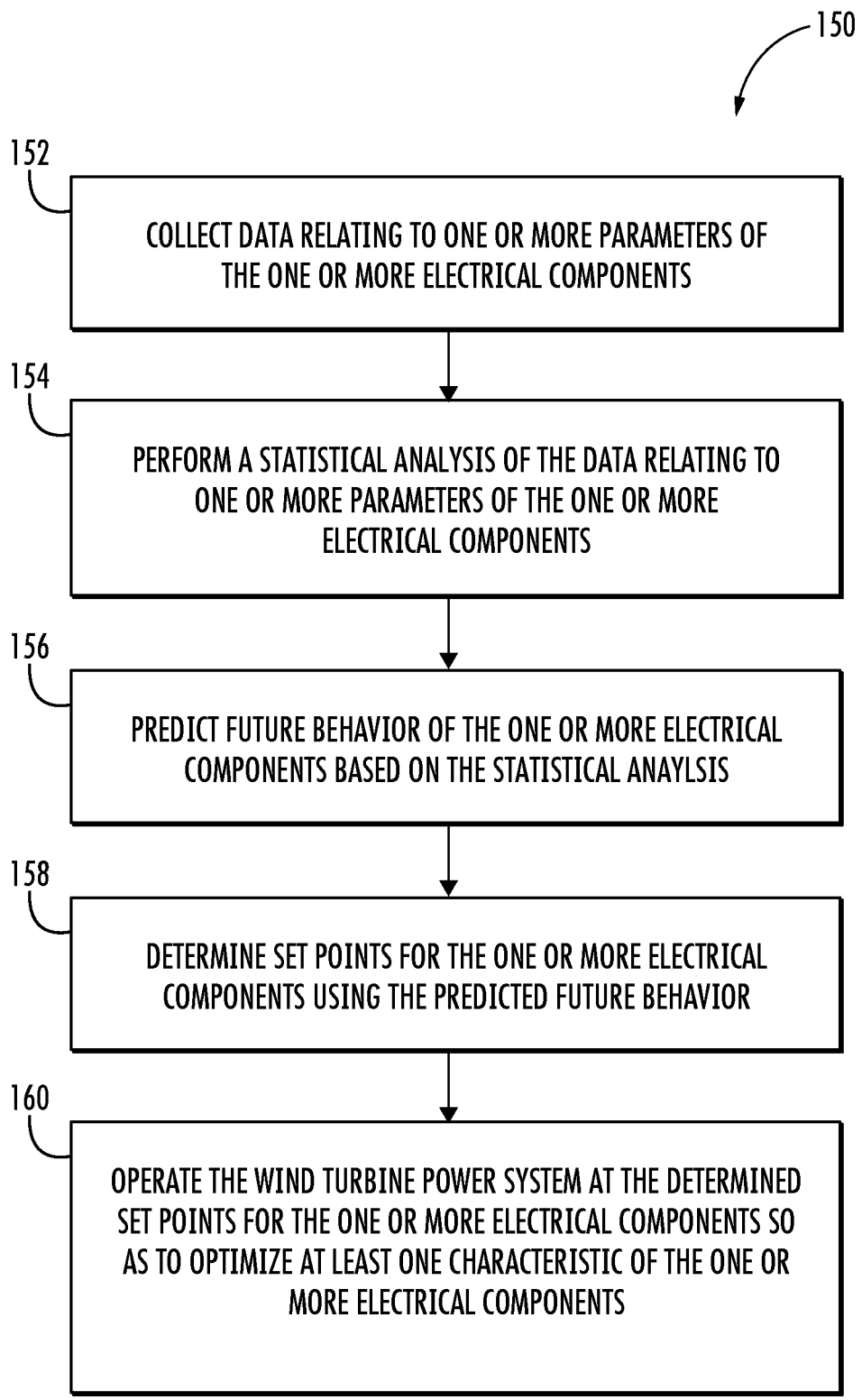
FIG. 6 illustrates a flow diagram of one embodiment of a method for operation a wind turbine according to the present disclosure.

Referring now to FIG. 6, a flow chart of one embodiment of a method 150 for operating a wind turbine power system connected to an electrical grid is illustrated. More specifically, as mentioned, the wind turbine power system 100 includes a plurality of electrical components, such as for example, the generator 102, the power converter 106, the transformer 130, switchgears, cables or cabling, the pitch system 32, and the yaw system 42, among others. In general, the method 150 will be described herein with reference to the wind turbine 10, the wind turbine power system 100, and the controllers 26, 120 of FIGS. 1-5. However, it should be appreciated that the disclosed method 150 may be implemented with wind turbines having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (152), the method 150 may include collecting data relating to one or more parameters of the electrical component(s). In another embodiment, the data may include, for example, predicted or forecasted data, simulated data, measured operational data, calculated data, turbine fleet data, and/or historical data. In addition, the parameter(s) as described herein may include, for example, voltage, current, temperature, time, and/or combinations or functions thereof. Moreover, the data may be stored in a single database or a plurality of databases. Thus, in an embodiment, the data may be collected from each of the plurality of databases.

As shown at (154), the method 150 may include performing a statistical analysis of the data relating to one or more parameters of the electrical component(s). In several embodiments, for example, the statistical analysis may include an individual probability, a combined probability, a mean, an outlier, a standard deviation, and/or combinations thereof, as well as any other suitable statistical analysis. For example, in an embodiment, the individual probability or the combined probability may include, for example, a probability of the electrical component(s) operating in a certain range, a probability of one or more certain events occurring in the electrical component(s), or a probability of one or more certain conditions occurring in the electrical component(s).

In particular embodiments, one of the controllers described herein may be configured to determine a first probability of the electrical component(s) operating in a first range or a first event occurring in the electrical component(s) and a second probability of the electrical component(s) operating in a second range or a second event occurring in the electrical component(s). The controller may then multiply the first and second probabilities of the first and second events together to obtain the combined probability. In another embodiment, the method 150 may include estimating the probability of operation of the electrical component(s) throughout a P-Q capability curve using the data described herein.

Referring still to FIG. 6, as shown at (156), the method 150 may include predicting future behavior of the electrical component(s) based on the statistical analysis. For example, the future behavior generally refers to various properties or characteristics of the electrical component(s) that affect optimization of the system. Therefore, such behavior may include power output, reliability, maintenance, capability, failure rate, temperature, voltage, current, or any other suitable parameter. In other words, in one example, the controller can use the probability of various scenarios occurring and design or operate a less-expensive system by operating closer to limits with less design margin.

As shown at (158), the method 150 may include determining set points for the electrical component(s) using the predicted future behavior. As shown at (160), the method 150 may include operating the wind turbine power system 100 at the determined set points for the electrical component(s) so as to optimize at least one characteristic of the electrical component(s). For example, in an embodiment, the characteristic(s) of the electrical component(s) may include at least one of power output, reliability, maintenance, capability, failure rate, or any other suitable parameter. Thus, in additional embodiments, the method 150 may also include optimizing the characteristic(s) of the electrical component(s) by allowing for increases or decreases in the characteristic(s) of the electrical component(s) based on the statistical analysis. For example, in certain embodiments, the controller may implement a control action, such as for example, pitching one or more rotor blades 22 of the wind turbine 10, yawing the nacelle 16 of the wind turbine 10 (e.g. away from the incoming wind direction 52), derating the wind turbine 10, and/or any other suitable control action.

In a particular embodiment, the method 150 may include determining the set points for the electrical component(s) using, for example, the probability of operation of the electrical component(s) throughout the P-Q capability curve. Thus, in such embodiments, the method 150 may further include optimizing power output of the wind turbine power system 100 using the probability of operation of the electrical component(s) throughout the P-Q capability curve.

In yet another embodiment, the method 150 may include deriving region data from the collected data relating to the parameter(s) of the electrical component(s) and generating one or more region-specific P-Q capability curves based on the region data. For example, in regions where probability of conjoined terms (e.g. high temperature, high wind (high power), high VAR demand, high PU voltage variation, etc.) are low, the controller may expand the P, Q capability curve so as to allow increased real (P) and/or reactive (Q) power. Further, with probabilistic historical data of the region, this knowledge may be applied to forecast conditions and set these region and/or seasonally specific operating bounds.

In still further embodiments, the method 150 may include customizing expansion of the P-Q capability curve, for example, by coupling the additional reactive power generation unit 138 (FIG. 3), such as a modular VAR box, with the wind turbine power system 100. In such embodiments, the reactive power generation unit 138 can be used to customize the P, Q operation for customer needs based on probability analysis for the customer, region, or site. In addition, the reactive power generation unit 138 can enable additional P and/or Q turbine capability with this additional power electronic reactive power supplement. For example, a 1.85 MW wind turbine power system could be pushed to 1.95 MW at 0.9 PF with the addition of the reactive power generation unit 138, provided there is high confidence and low risk captured for the expanded P, Q curves. Moreover, by defining and selecting the size of the reactive power generation unit 138, the methods described herein can be further expanded based on a simulation that incorporates historical grid data.

In particular embodiments, wherein the wind turbine power system 100 is part of the wind farm 50, the method 150 may further include maximizing, via the farm-level controller 56, a capability of each of the plurality of wind turbines 53 in the wind farm 50 depending on the individual probability or the combined probability for specific wind turbines 53 so as to optimize power output of the wind farm 50. In such embodiments, by applying knowledge of farm localized capability (such as wind variation across the wind farm 50, wake impacts across the wind farm 50, cabling, transformer limits, etc.), such capabilities can be maximized.

In still additional embodiments, the method 150 may include acquiring data relating to derating of the wind turbine power system(s) 100 due solely to increasing VAR demand from the electrical grid and converting the data to a revenue decrease for the wind turbine power system(s) 100 due to VAR-related derates. Accordingly, the controller may use simulation to measure financial savings to OEM when the electrical components are designed with reduced overall capability to optimize capability only in the high probability regions in the P, Q curve, based on historical data. The financial impact of increased VAR-related derates may then be compared with the financial savings of less-capable electrical components, using historical grid data.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

Various aspects and embodiments of the present invention are defined by the following numbered clauses:

Clause 1. A method for operating a wind turbine power system connected to an electrical grid, the wind turbine power system having one or more electrical components, the method comprising:
collecting data relating to one or more parameters of the one or more electrical components:
performing a statistical analysis of the data relating to one or more parameters of the one or more electrical components;
predicting future behavior of the one or more electrical components based on the statistical analysis:
determining set points for the one or more electrical components using the predicted future behavior; and,
operating the wind turbine power system at the determined set points for the one or more electrical components so as to optimize at least one characteristic of the one or more electrical components.

Clause 2. The method of clause 1, wherein the one or more electrical components comprise at least one of a generator, a power converter, a transformer, a switchgear, cables or cabling, a pitch system, or a yaw system.

Clause 3. The method of any of the preceding clauses, wherein the data comprises at least one of predicted or forecasted data, simulated data, measured operational data, calculated data, turbine fleet data, or historical data, the data being stored in at least one database, the one or more parameters comprising at least one of voltage, current, temperature, time, and/or combinations or functions thereof.

Clause 4. The method of any of the preceding clauses, wherein the data is stored in a plurality of databases, wherein collecting the data relating to the one or more parameters of the one or more electrical components further comprises collecting the data relating to the one or more parameters of the one or more electrical components from the plurality of databases.

Clause 5. The method of any of the preceding clauses, wherein the statistical analysis comprises at least one of: an individual probability, a combined probability, a mean, an outlier, a standard deviation, or combinations thereof.

Clause 6. The method of clause 5, wherein the individual probability or the combined probability comprises at least one of: a probability of the one or more electrical components operating in a certain range, a probability of one or more certain events occurring in the one or more electrical components, or a probability of one or more certain conditions occurring in the one or more electrical components.

Clause 7. The method of clause 5, wherein the wind turbine power system is part of a wind farm comprising a plurality of wind turbine power systems, the method further comprising:
maximizing, via a farm-level controller that distributes real power and/or reactive power demands differently across the plurality of wind turbine power systems, a capability of each of the plurality of wind turbine power systems in the wind farm depending on the individual probability or the combined probability for specific wind turbine power systems of the plurality of wind turbine power systems so as to optimize power output of the wind farm.

Clause 8. The method of clause 5, wherein applying the statistical analysis to the data relating to the one or more parameters of the one or more electrical components further comprises:
determining a first probability of the one or more electrical components operating in a first range or a first event occurring in the one or more electrical components;
determining a second probability of the one or more electrical components operating in a second range or a second event occurring in the one or more electrical components; and
multiplying the first and second probabilities of the first and second events together to obtain the combined probability.

Clause 9. The method of any of the preceding clauses, wherein the at least one characteristic of the one or more electrical components comprising at least one of power output, reliability, maintenance, capability, or failure rate.

Clause 10. The method of clause 9, further comprising optimizing the at least one characteristic of the one or more electrical components by allowing for increases or decreases in the at least one characteristic of the one or more electrical components based on the statistical analysis.

Clause 11. The method of any of the preceding clauses, further comprising:
estimating the probability of operation of the one or more electrical components throughout a P-Q capability curve using the data;
determining the set points for the one or more electrical components using the probability of operation of the one or more electrical components throughout the P-Q capability curve.

Clause 12. The method of clause 11, further comprising optimizing power output of the wind turbine power system using the probability of operation of the one or more electrical components throughout the P-Q capability curve.

Clause 13. The method of clause 11, further comprising: deriving region data from the collected data relating to the one or more parameters of the one or more electrical components; and, generating one or more region-specific P-Q capability curves based on the region data.

Clause 14. The method of clause 11, further comprising customizing expansion of the P-Q capability curve by coupling an additional power generation unit with at least one of the wind turbine power system or a hybrid power generation system containing the wind turbine power system.

Clause 15. The method of any of the preceding clauses, further comprising:
acquiring data relating to derating of the wind turbine power system due solely to increasing VAR demand from the electrical grid; and,
converting the data to a revenue decrease for the wind turbine power system due to VAR-related derates.

Clause 16. A system for optimizing design of one or more electrical components of a wind turbine power system, the system comprising:
a controller comprising at least one processor, the processor configured to perform a plurality of operations, the plurality of operations comprising:
collecting data relating to one or more parameters of the one or more electrical components:
performing a statistical analysis of the data relating to one or more parameters of the one or more electrical components, the statistical analysis comprising, at least, a combined probability;
predicting future behavior of the one or more electrical components based on the statistical analysis:
sizing the one or more electrical components using the predicted future behavior so as to minimize design margins of the one or more electrical components; and,
installing the wind turbine power system according to the sizing so as to optimize at least one characteristic of the one or more electrical components.

Clause 17. The system of clause 16, wherein the one or more electrical components comprise at least one of a generator, a power converter, a transformer, a switchgear, cables or cabling, a pitch system, or a yaw system.

Clause 18. The system of clauses 16-17, wherein the at least one characteristic of the one or more electrical components comprising at least one of power output, reliability, maintenance, capability, or failure rate.

Clause 19. The system of clauses 16-18, further comprising at least one database for storing the data, the data comprising at least one of predicted or forecasted data, simulated data, measured operational data, calculated data, turbine fleet data, or historical data, the one or more parameters comprising at least one of voltage, current, temperature, time, and/or combinations or functions thereof.

Clause 20. The system of clause 17, further comprising an additional power generation unit coupled with the wind turbine power system or a hybrid power generation system containing the wind turbine power system for customizing expansion of a P-Q capability curve representative of operation of the one or more electrical components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind farm comprising a plurality of wind turbine power systems connected to an electrical grid, each of the wind turbine power systems having one or more electrical components, the method comprising:
collecting data relating to one or more parameters of the one or more electrical components;
performing a statistical analysis comprising at least one of an individual probability analysis, a combined probability analysis, a mean analysis, an outlier analysis, a standard deviation analysis, or combinations thereof of the data relating to one or more parameters of the one or more electrical components;
predicting future behavior of the one or more electrical components based on the statistical analysis;
determining set points for the one or more electrical components using the predicted future behavior;
operating the wind turbine power system at the determined set points for the one or more electrical components so as to optimize at least one characteristic of the one or more electrical components; and
maximizing, via a farm-level controller that distributes real power and/or reactive power demands differently across the plurality of wind turbine power systems, a capability of each of the plurality of wind turbine power systems in the wind farm depending on the individual probability or the combined probability for specific wind turbine power systems of the plurality of wind turbine power systems so as to optimize power output of the wind farm.

2. The method of claim 1, wherein the one or more electrical components comprise at least one of a generator, a power converter, a transformer, a switchgear, cables or cabling, a pitch system, or a yaw system.

3. The method of claim 1, wherein the data comprises at least one of predicted or forecasted data, simulated data, measured operational data, calculated data, turbine fleet data, or historical data, the data being stored in at least one database, the one or more parameters comprising at least one of voltage, current, temperature, time, and/or combinations or functions thereof.

4. The method of claim 1, wherein the data is stored in a plurality of databases, wherein collecting the data relating to the one or more parameters of the one or more electrical components further comprises collecting the data relating to the one or more parameters of the one or more electrical components from the plurality of databases.

5. The method of claim 1, wherein the individual probability or the combined probability comprises at least one of: a probability of the one or more electrical components operating in a certain range, a probability of one or more certain events occurring in the one or more electrical components, or a probability of one or more certain conditions occurring in the one or more electrical components.

6. The method of claim 1, wherein the at least one characteristic of the one or more electrical components comprising at least one of power output, reliability, maintenance, capability, or failure rate.

7. The method of claim 6, further comprising optimizing the at least one characteristic of the one or more electrical components by allowing for increases or decreases in the at least one characteristic of the one or more electrical components based on the statistical analysis.

8. The method of claim 1, further comprising:
acquiring data relating to derating of the wind turbine power system due solely to increasing VAR demand from the electrical grid; and,
converting the data to a revenue decrease for the wind turbine power system due to VAR-related derates.

9. A method for operating a wind turbine power system connected to an electrical grid, the wind turbine power system having one or more electrical components, the method comprising:
collecting data relating to one or more parameters of the one or more electrical components;
performing a statistical analysis comprising at least one of an individual probability analysis, a combined probability analysis, a mean analysis, an outlier analysis, a standard deviation analysis, or combinations thereof of the data relating to one or more parameters of the one or more electrical components, wherein performing the statistical analysis comprises determining a first probability of the one or more electrical components operating in a first range or a first event occurring in the one or more electrical components, determining a second probability of the one or more electrical components operating in a second range or a second event occurring in the one or more electrical components, and multiplying the first and second probabilities of the first and second events together to obtain the combined probability;
predicting future behavior of the one or more electrical components based on the statistical analysis;
determining set points for the one or more electrical components using the predicted future behavior; and,
operating the wind turbine power system at the determined set points for the one or more electrical components so as to optimize at least one characteristic of the one or more electrical components.

10. A method for operating a wind turbine power system connected to an electrical grid, the wind turbine power system having one or more electrical components, the method comprising:
collecting data relating to one or more parameters of the one or more electrical components;
performing a statistical analysis comprising estimating a probability of operation of the one or more electrical components throughout a P-Q capability curve using the data;
predicting future behavior of the one or more electrical components based on the statistical analysis;
determining set points for the one or more electrical components using the predicted future behavior and the probability of operation of the one or more electrical components throughout the P-Q capability curve; and
operating the wind turbine power system at the determined set points for the one or more electrical components so as to optimize at least one characteristic of the one or more electrical components.

11. The method of claim 10, further comprising optimizing power output of the wind turbine power system using the probability of operation of the one or more electrical components throughout the P-Q capability curve.

12. The method of claim 10, further comprising:
deriving region data from the collected data relating to the one or more parameters of the one or more electrical components; and,
generating one or more region-specific P-Q capability curves based on the region data.

13. The method of claim 10, further comprising customizing expansion of the P-Q capability curve by coupling an additional power generation unit with at least one of the wind turbine power system or a hybrid power generation system containing the wind turbine power system.

* * * * *